(12) United States Patent
Goto et al.

(10) Patent No.: US 8,105,540 B2
(45) Date of Patent: Jan. 31, 2012

(54) METHOD OF TREATING POLYMER COMPOUND AND TREATMENT SYSTEM FOR THE SAME

(75) Inventors: Toshiharu Goto, Hitachi (JP); Takanori Yamazaki, Hitachi (JP); Yoshihiko Iwamoto, Hiroshima (JP); Jun Kakizaki, Hiroshima (JP)

(73) Assignees: Hitachi Cable, Ltd., Tokyo (JP); The Japan Steel Works, Ltd., Tokyo (JP)

( * ) Notice: Subject to any disclaimer, the term of this patent is extended or adjusted under 35 U.S.C. 154(b) by 0 days.

(21) Appl. No.: 12/821,788

(22) Filed: Jun. 23, 2010

(65) Prior Publication Data
US 2010/0260881 A1     Oct. 14, 2010

Related U.S. Application Data

(62) Division of application No. 11/095,657, filed on Apr. 1, 2005, now Pat. No. 7,767,124.

(30) Foreign Application Priority Data

Apr. 2, 2004   (JP) ................. 2004-110018

(51) Int. Cl.
*B01J 19/18* (2006.01)
*B01J 19/00* (2006.01)
*B01J 19/20* (2006.01)
*B28B 17/00* (2006.01)
*B29B 13/00* (2006.01)
*B29C 47/92* (2006.01)
*B29C 47/38* (2006.01)
*B29C 47/78* (2006.01)

(52) U.S. Cl. ........ 422/135; 422/129; 422/131; 422/137; 422/138; 425/145; 425/146; 264/211.21; 264/211.24

(58) Field of Classification Search .............. 422/129, 422/131, 135, 137, 138; 425/145, 146; 264/211, 264/211.21, 211.24
See application file for complete search history.

(56) References Cited

U.S. PATENT DOCUMENTS 3,551,943 A * 1/1971 Staton et al. ............... 425/71
4,511,680 A * 4/1985 Niederdellmann et al. . 521/49.5
(Continued)

FOREIGN PATENT DOCUMENTS

JP    8-300352 A    11/1996
(Continued)

OTHER PUBLICATIONS

Machine translation of JP 2004-058387 A, which was published on Feb. 26, 2004.*

(Continued)

*Primary Examiner* — Walter D Griffin
*Assistant Examiner* — Natasha Young
(74) *Attorney, Agent, or Firm* — Foley & Lardner LLP

(57) ABSTRACT

A method of treating a polymer compound has the steps of: mixing and agitating the polymer compound and a chemical agent in an extruder while controlling the inside of the extruder to be kept at a high temperature and a high pressure to have a reaction mixture containing a polymer treated product; supplying the reaction mixture continuously into a high-pressure container disposed following the extruder and retaining the reaction mixture at the high temperature and high pressure for a predetermined time; then supplying the reaction mixture continuously to a chemical agent separator to separate the polymer treated product; and supplying the separated polymer treated product continuously to a molding means to form it into a molded material.

8 Claims, 3 Drawing Sheets

U.S. PATENT DOCUMENTS

| | | | |
|---|---|---|---|
| 5,566,888 A | 10/1996 | Yamamoto |
| 5,635,224 A | 6/1997 | Brooks |
| 5,811,036 A | 9/1998 | Takahashi et al. |
| 5,980,790 A | 11/1999 | Kuwahara et al. |
| 6,217,804 B1 | 4/2001 | Lieberman |
| 6,311,906 B1 | 11/2001 | Kim |
| 6,620,906 B1 | 9/2003 | Elsner et al. |
| 6,777,453 B1 | 8/2004 | Matsushita et al. |
| 6,797,803 B2 | 9/2004 | Inoue et al. |
| 7,235,219 B2 | 6/2007 | Nakajima et al. |

FOREIGN PATENT DOCUMENTS

| | | | |
|---|---|---|---|
| JP | 2001-253967 A | | 9/2001 |
| JP | 2002-249618 A | | 9/2002 |
| JP | 2004058387 A | * | 2/2004 |
| WO | WO 02/072681 A1 | | 9/2002 |

OTHER PUBLICATIONS

Machine translation of JP 2002-249618 A, which was published on Sep. 6, 2002 and cited in the IDS dated Jun. 23, 2010.*

* cited by examiner

METHOD OF TREATING POLYMER COMPOUND AND TREATMENT SYSTEM FOR THE SAME

The present application is a divisional of U.S. application Ser. No. 11/095,657, filed Apr. 1, 2005, which claims benefit of priority from the prior Japanese Application No. 2004-110018, filed on Apr. 2, 2004, the entire contents of which are incorporated herein by reference.

BACKGROUND OF THE INVENTION

1. Field of the Invention

This invention relates to a method of treating a polymer compound by retaining the polymer compound and a chemical agent in a high-temperature and high-pressure condition so as to process the polymer compound into a thermoplastic resin or wax, and it relates to a treatment system for the polymer compound.

2. Description of the Related Art

In recent years, as the recycle and reuse of wastes are considered to be important in environmental problems, there is a high trend also to the recycling and reuse of polymer compounds. In such a trend, among these polymer compounds, thermoplastic resins can be fluidized by heating so that they can be molded again. Therefore, they are actually subjected to a material recycle (being recycled as a material).

In contrast, resins and elastomers such as thermosetting resins and crosslinked polymers cannot be fluidized by heating because the three-dimensional network among the molecules which cause poor processability of the polymer is not broken by heating. Thus, they are difficult to recycle. As a result, most of the thermosetting resins and crosslinked polymers are currently subjected to the waste disposal such as a land disposal, while part of them is treated in a thermal recycle (being recycled as a fuel).

However, the material recycle of the thermosetting resins and crosslinked polymers is increasingly researched and some methods thereon are suggested thus far.

For example, a method is suggested that the three-dimensional network structure among the molecules of a thermosetting resin is broken to process the resin into thermoplastic so as to recycle it as a thermoplastic resin by chemical agent in a high temperature and pressure. Another method is suggested that the main chain of a polymer is cut to have smaller molecules, thus processing the polymer into wax, which can be recycled as an additive to resins by chemical agent in a high temperature and pressure.

In order to commercially conduct such a method, a process is needed that the polymer is treated continuously. Extruders are suited for the process. This is because heat and pressure are needed to break the stable three-dimensional network structure among the molecules of a thermosetting resin and crosslinked polymer to process the resin and polymer into thermoplastic. The extruders can satisfy the conditions needed to process the polymer into thermoplastic. That is also true with the case of processing the polymer into wax.

Also, when processing it thermoplastic, an additive such as a thermoplastic resin or a chemical agent is usually added to the thermosetting resin or crosslinked polymer. In this case, the extruder allows the additive to be easily introduced thereinto.

Japanese patent application laid-open No. 8-300352 (related art 1) discloses a method that a primary amine or secondary amine as a coating film decomposer is mixed with a thermoplastic resin with a thermosetting resin coating film by using an extruder, where the thermoplastic resin is recycled at a temperature of 200 to 300° C. and a pressure of 10 to 100 $kg/cm^2$.

Japanese patent application laid-open No. 2001-253967 (related art 2) discloses a method that a crosslinked polyethylene and water are supplied to an extruder, extruded under the conditions that allow water to be in a supercritical state or sub-critical state, i.e., at a temperature of 200 to 1000° C. and a pressure of 2 to 100 MPa, whereby a thermoplastic material is obtained.

Japanese patent application laid-open No. 2002-249618 (related art 3) discloses a method that a crosslinked polymer is extruded from an extruder to a reactor, a high-temperature and high-pressure fluid (a chemical agent) is supplied to the reactor by using a fluid-supply pump to react them to produce a reaction product, the reaction product and the unreacted chemical agent are introduced into a separator to separate the reaction product from the chemical agent, and the reaction product is discharged externally by using an extruder.

In the related art 1, the primary or secondary amine acts as the chemical agent to process the thermosetting resin or crosslinked polymer into the thermoplastic in the chemical reaction. In the related art 2, the water acts as well. However, these methods have the problem that the time required for the chemical reaction between the chemical agent and the thermosetting resin cannot be sufficiently secured in the extruder.

Also, in the related art 3, the reaction between the polymer compound and the chemical agent (high-temperature and high-pressure fluid) cannot be sufficiently conducted in the reactor since it is conducted in the reactor not in the extruder. Thus, this method has a limitation in enhancing the treatment capacity.

SUMMARY OF THE INVENTION

It is an object of the invention to provide a method of treating a polymer compound that allows the continuous treatment of the polymer compound and a high yield in the treated product.

It is another object of the invention to provide a treatment system used for the above method.

According to one aspect of the invention, a method of treating a polymer compound wherein the polymer compound and a chemical agent are kept at a high temperature and a high pressure, comprises the steps of:

mixing and agitating the polymer compound and the chemical agent in an extruder while controlling the inside of the extruder to be kept at the high temperature and the high pressure to react the polymer compound with the chemical agent to have a reaction mixture comprising a polymer treated product;

supplying the reaction mixture continuously into a high-pressure container disposed following the extruder and retaining the reaction mixture at the high temperature and high pressure for a predetermined time;

then supplying the reaction mixture continuously to a chemical agent separator to separate a polymer treated product from the chemical agent; and supplying the separated polymer treated product continuously to a molding means to form the polymer treated product into a molded material.

It is preferred that the reaction mixture retained in the high-pressure container for the predetermined time is continuously supplied to the chemical agent separator under a pressure lower than the internal pressure of the high-pressure container to separate the polymer treated product from the chemical agent.

It is preferred that the separated chemical agent is supplied to an impurity separator to separate and remove an impurity and the impurity-removed chemical agent is again supplied to the extruder.

It is preferred that the polymer treated product supplied to the molding means is extrusion-molded into a material by the molding means, and the extrusion-molded material is cooled and cut into a predetermined shape.

It is preferred that the polymer compound is reacted with the chemical agent to cause a denaturation reaction, a decomposition reaction or a crosslink-cutting reaction in which the crosslinked point or a molecular chain of a crosslinked polymer is cut.

It is preferred that the polymer compound comprises a crosslinked polymer and the chemical agent comprises an alcohol or a mixture containing the alcohol.

According to another aspect of the invention, a treatment system of a polymer compound wherein the polymer compound and a chemical agent are kept at a high temperature and a high pressure, comprises:

an extruder that mixes and agitate the polymer compound and the chemical agent to react the polymer compound with the chemical agent to have a reaction mixture comprising a polymer treated product;

a high-pressure container integrated with the extruder;

a chemical agent separator connected following the high-pressure container to separate the reaction mixture into the polymer treated product and the chemical agent:

a molding means connected to the chemical agent separator to mold the separated polymer treated product; and a pressure control means disposed between the high-pressure container and the chemical agent separator.

It is preferred that the high-pressure container comprises a continuous reactor tube.

It is preferred that the treatment system further comprises: a heating means for heating the extruder and the high-pressure container to the high temperature, and a pressure control means for keeping constant the internal pressure of the chemical agent separator.

It is preferred that the heating means comprise an electric heater disposed around the chemical agent separator.

It is preferred that the heating means is disposed on the outer periphery of the chemical agent separator, and provided with a jacket in which a heating medium is circulated and a heating medium circulating device that supplies the heating medium to the jacket.

It is preferred that the molding means comprises a molding extruder to form the polymer treated product into an extrusion-molded material, a cooler to cool the extrusion-molded material, and a cutting device to cut the cooled extrusion-molded material.

It is preferred that the pressure control means comprises a discharge valve.

It is preferred that the pressure control means comprises a combination of a discharge valve and a resistor with plural holes.

It is preferred that the pressure control means comprises a resistor with plural holes, a flow control valve or a combination thereof.

ADVANTAGES OF THE INVENTION

According to the present invention, the polymer compound and the chemical agent are mixed and agitated by using the extruder and, even during such a process, a sufficient reaction time can be secured and the polymer compound can be treated continuously and homogeneously. Especially, this invention is effective for treatment of the polymer using supercritical fluid of the chemical agent.

BRIEF DESCRIPTION OF THE DRAWINGS

The preferred embodiments according to the invention will be explained below referring to the drawings, wherein.

PREFERRED EMBODIMENTS OF THE INVENTION

Figure 1:
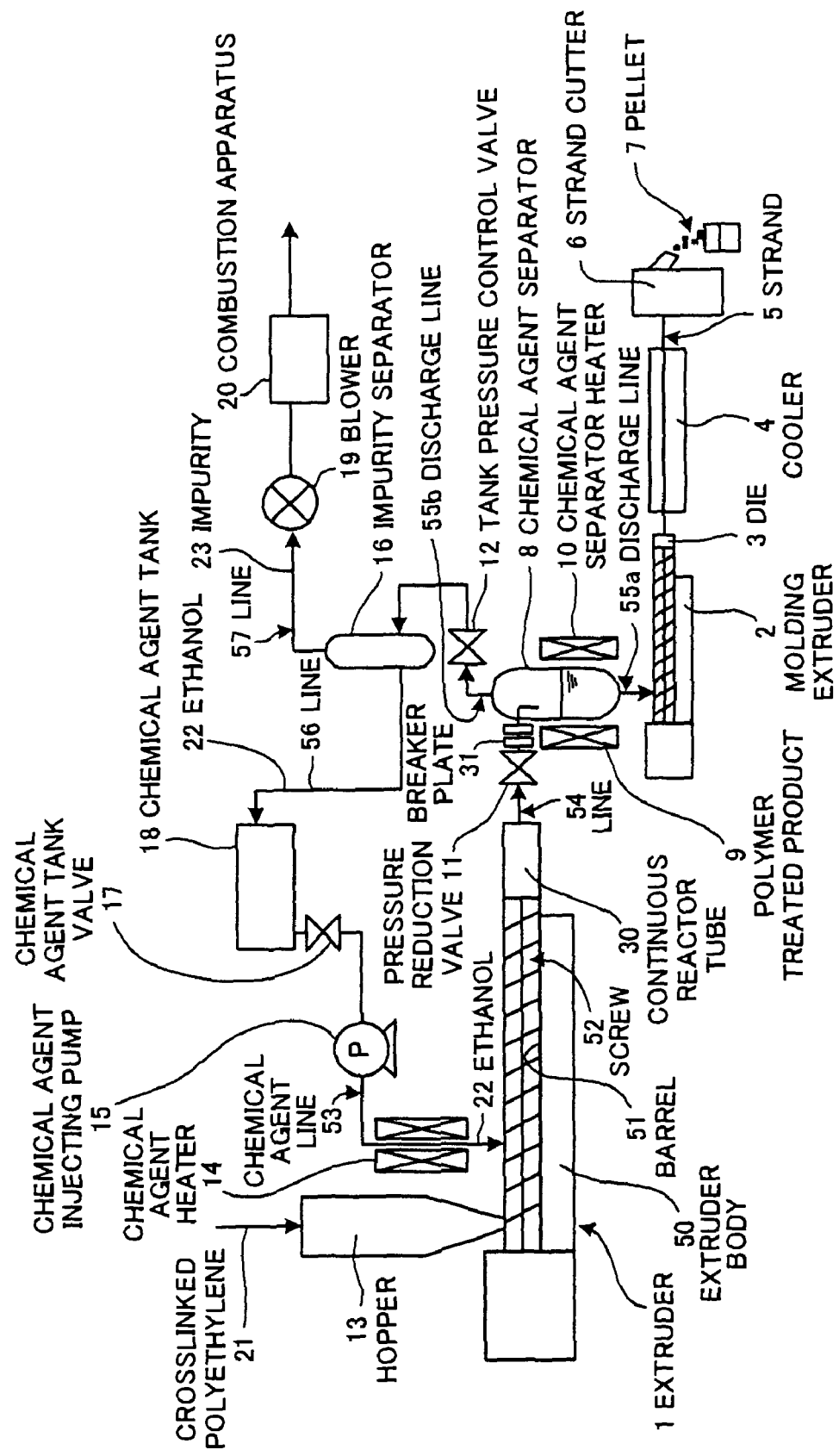
FIG. 1 is a system diagram showing a treatment system for a polymer compound in a preferred embodiment according to the invention.

Various studies are made by the inventors and, as a result, it is found that, in order to perform a reaction (e.g., a crosslink cutting reaction) in the mixture of a polymer compound (e.g., a crosslinked polymer) and a chemical agent, it is needed to have the mixture kept at a predetermined temperature and pressure during a certain retention time. Also, it is found that the retention time cannot be secured by using only a continuous treatment system, e.g., an extruder, since the time is not sufficient when the mixture is retained in a cylinder of the extruder. On the other hand, the mixing and agitation of the polymer compound and the chemical agent in the extruder are indispensable in conducting the reaction sufficiently.

A treatment system for a polymer compound in the preferred embodiment according to the invention comprises:

an extruder that mixes and agitates a polymer compound subjected to the treatment and a chemical agent to react the polymer compound with the chemical agent to have a reaction mixture that may have a polymer treated product generated by the treatment or reaction, the unreacted polymer compound and the unreacted chemical agent;

a continuous reactor tube (or a high-pressure container) disposed following the extruder and integrated with the extruder to retain the reaction mixture while continuously flowing the reaction mixture and having the reaction mixture kept at a temperature and a pressure that allow the continuation of the reaction;

a chemical agent separator that is connected following the high-pressure container to separate the reaction mixture (i.e., the mixture of the liquid polymer treated product and the gaseous chemical agent) into the polymer treated product and the chemical agent:

a molding means that is connected following the chemical agent separator to mold the separated polymer treated product into a molded material; and a pressure control means that is disposed between the continuous reactor tube and the chemical agent separator to control the internal pressure of the extruder and the continuous reactor tube.

The polymer compound so-called in this embodiment includes synthetic high-polymer compounds such as crosslinked polymers and thermosetting resins such as plastics and elastomers, natural polymer compounds such as lignin, cellulose and proteins or a mixture of the synthetic polymer compounds and natural polymer compounds. The polymer compound in this embodiment may be a material, such as a shredder dust, containing a polymer compound as a major component and other material. Also, the polymer compound preferably has a pellet-like form when fed to the extruder and the pellets are obtained by crushing the polymer compound.

The treatment reaction that the polymer compound and the chemical agent are retained at a high temperature and pressure includes a denaturation reaction, decomposition reaction or a crosslink cutting reaction for cutting the crosslink points or molecular chain of the crosslinked polymer.

The chemical agent may be any substance that can react with the polymer compound as described above, such as alcohols and a mixture containing alcohols.

FIG. 1 is a system diagram showing a cross link cutting device for a crosslinked polyethylene, which is one example of the treatment system in the embodiment of the invention.

To explain the treatment system of the embodiment in more detail, as shown in FIG. 1, an extruder 1 is composed of: an extruder body 50 to knead a crosslinked polyethylene (=polymer compound) 21 and an ethanol (=chemical agent) 22; a hopper 13 connected upstream of a barrel 51 in the extruder body 50 to supply the pelletized crosslinked polyethylene 21 to the barrel 51; and an injection means connected downstream of (to the right side in FIG. 1) the position of the hopper 13 on the barrel 51 to inject the ethanol 22 into the barrel 51.

The extruder body 50 has a screw 52, which is rotated by driving means (not shown) such as a motor, in the barrel 51. Also, a barrel heater (not shown) for heating the crosslinked polyethylene 21 is disposed around the barrel 51. The extruder body 50 can be of any type that can knead the crosslinked polyethylene 21 and the ethanol 22 sufficiently. For example, the extruder body 50 includes a two-shaft extruder, which has the screws 52 to be rotated in the same directions or different directions, and a single-shaft extruder. Preferably, the extruder body 50 is the two-shaft extruder that can prevent the back-flow of the high-temperature and pressure ethanol 22 and can knead the crosslinked polyethylene 21 and the ethanol 22 sufficiently.

The injection means is provided with a chemical agent tank 18 to store the ethanol 22, a chemical agent line 53 to connect the chemical agent tank 18 with the barrel 51, a chemical agent tank valve 17 and a chemical agent injecting pump 15 that are disposed in the midway of the chemical agent line 53, and a chemical agent heater 14 that is disposed downstream of the chemical agent line 53 so as to surround the chemical agent line 53.

An elongated continuous reactor tube 30 that has the same (or substantially the same) diameter as the barrel 51 is disposed following the extruder body 50, and it is integrated with the extruder body 50. Also, a reactor tube heater (not shown) is provided around the continuous reactor tube 30. The necessary length of the continuous reactor tube 30 can be determined by dividing a volume (inner volume), which is defined as the product of the treatment capacity (treatment flow rate) of the extruder body 50 and the time required to completely react the reaction mixture (i.e., the mixture of the polymer treated product 9 and the vapor ethanol 22) of the crosslinked polyethylene 21 and the ethanol 22, by the sectional area of the reactor tube 30. The continuous reactor tube 30 has such a structure that can stand against the temperature and pressure needed for the reaction.

A chemical agent separator 8 is connected following the continuous reactor tube 30 through a line 54. The line 54 is provided with a pressure control means (a flow rate control valve). For example, a pressure reduction valve 11 (a discharge valve) and a breaker plate 31, which is a resistor plate with plural holes, are provided in this order from the upstream side.

The chemical agent separator 8 is a vessel that has an inner volume enough to address the flow rate (volume) of the reaction mixture of the crosslinked polyethylene 21 and the ethanol 22 per unit time. The aforementioned line 54 is connected to the upper part of the chemical agent separator 8. Also, a chemical agent separator heater (heating means) 10 is disposed on the lower part of the chemical agent separator 8 to surround the chemical agent separator 8. Further, discharge lines 55a and 55b are connected to the bottom and the top of the chemical agent separator 8. A molding means (including a molding extruder 2 etc.) and an impurity separator 16 are connected to the chemical agent separator 8 through the discharge lines 55a and 55b. A tank pressure control valve 12, which is a pressure control means, is disposed in the midway of the discharge line 55b. A jacket may be disposed around the body of the chemical agent separator 8 instead of the chemical agent separator heater 10 and may be provided with a heating medium circulating device to circulate a heating medium in the jacket. If the body of the chemical agent separator 8 is composed of an insulating material, the heating means is not always needed.

The molding means is composed of: a molding extruder 2; a cooler 4 to cool and solidify an extrusion-molded material (string-like strand) 5 extruded from a die 3 formed at the end of the molding extruder 2; and a strand cutter 6 to cut the cooled and solidified strand 5 into a predetermined length to form a pellet (molded material) 7. The molding extruder 2 may be a single-shaft or two-shaft extruder. The molding extruder 2 may have a vent opening disposed in the midway of the molding extruder 2 to completely remove the ethanol 22 from the polymer treated product 9.

Lines 56 and 57 are connected to the impurity separator 16. The impurity separator 16 is connected to the chemical agent tank 18 through the line 56. A blower 19 and a combustion apparatus 20 are disposed in the midway of the line 57 in this order from the upstream side.

Figure 3:
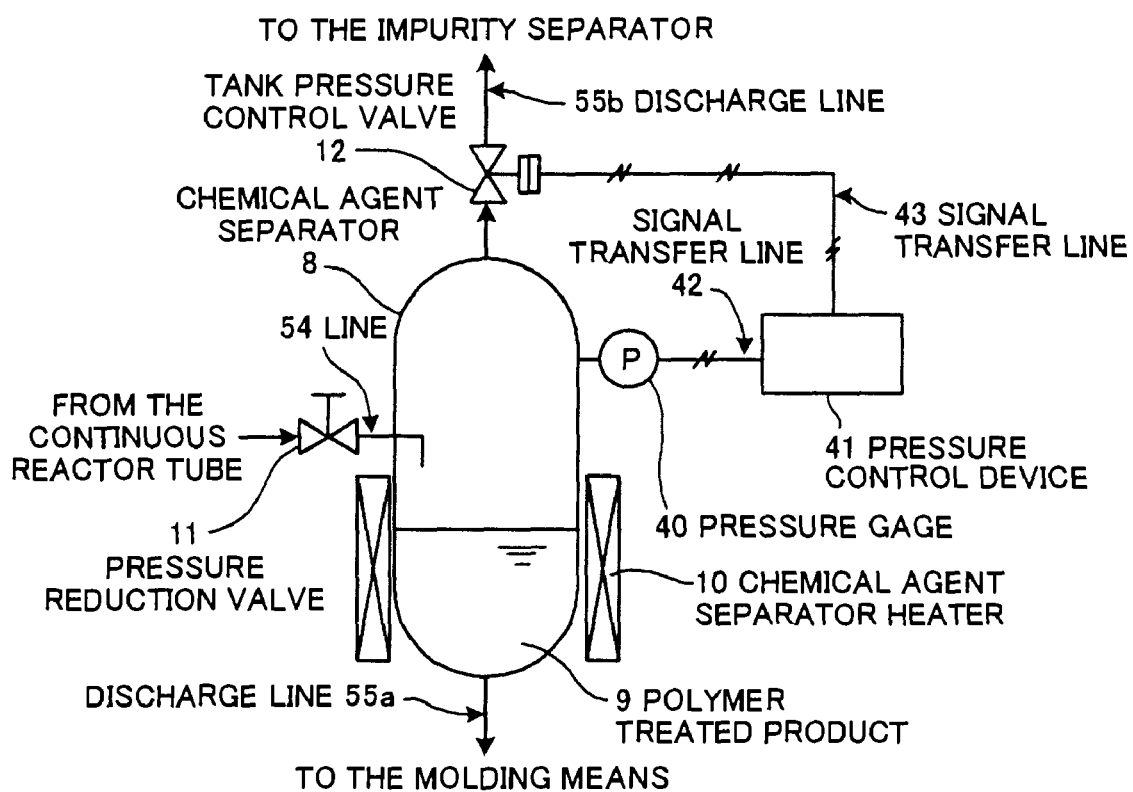
FIG. 3 is a schematic view showing a pressure control means in a chemical agent separator of FIG. 1.

As shown in FIG. 3, the pressure control means is composed of: a pressure gage 40 to measure the internal pressure of the chemical agent separator 8; and a pressure control device 41 to detect a variation in a measurement value obtained from the pressure gage 40 and to discharge the gaseous ethanol 22 through the line 55b so as to keep constant a pressure in the chemical agent separator 8. The pressure control device 41 may have an electric-operated or air-operated valve and an actuator or a resistor such as a breaker plate with plural holes or a combination of these devices.

Next, a treating method using the treatment system of the embodiment will be explained with reference to FIG. 1.

In the method of treating a polymer compound in the preferred embodiment of the present invention, at first, the crosslinked polyethylene 21 which is a polymer compound is supplied into the treatment system from the hopper 13, and the ethanol 22 which is a chemical agent is injected thereinto through the chemical agent line 53. At this time, the pressure of the ethanol 22 is increased more than the internal pressure of the barrel 51 by using the chemical agent injecting pump 15. Also, it is preferred that the temperature of the ethanol 22 is increased such that the temperature of the crosslinked polyethylene 21 increased by the barrel heater is not reduced, preferably such that the temperature needed to continue the reaction is secured. The position where the ethanol 22 is injected is preferably downstream of the position where the crosslinked polyethylene 21 is highly densified in the barrel 51, whereby the vaporized ethanol 22 can be prevented from flowing back to upstream of the extruder body 50 and from leaking there.

Next, the supplied crosslinked polyethylene 21 and the injected ethanol 22 are mixed and agitated by the screw 52 to knead them in the barrel 51. At this time, the crosslink cutting reaction between the crosslinked polyethylene 21 and the ethanol 22 starts when the temperature and pressure of at least a part of the inside of the barrel 51 is adjusted such that the ethanol 22 is put in a high-temperature and pressure state (for example, a supercritical state, sub-critical state or high-temperature and pressure state close to the sub-critical state). The temperature and the pressure of the barrel 51 are adjusted by controlling the heating temperature of the barrel heater and chemical agent heater 14, and the injecting pressure of the chemical agent injecting pump 15 and the rotations of the screw 52. When the temperature and pressure in the reaction system is appropriately adjusted, the crosslinked polyethylene 21 reacts with the ethanol 22 to produce ([reaction initiation step]) the reaction mixture (i.e., the mixture of the polymer treated product 9 and the gaseous ethanol 22).

Because the reaction mixture resulting from a completely progressed reaction cannot be obtained only by the extruder body 50 (i.e., since the time required to completely progress the reaction cannot be secured), the reaction mixture is supplied to the continuous reactor tube 30 integrated with the downstream side of the extruder body 50, to progress the reaction successively ([reaction progress step]). At this time, since the continuous reactor tube 30 has the same or substantially the same diameter as the barrel 51 of the extruder body 50, the pressure drop of the react ion mixture supplied to and passed through the continuous reactor tube 30 is almost zero. Also, the continuous reactor tube 30 is heated by the reactor tube heater so as not to change the temperature of the reaction mixture. Namely, the continuous reactor tube 30 is kept at the temperature and pressure (high-temperature and pressure state) required for the progress of the reaction. As a result, the time needed to progress the reaction completely can be secured while the reaction mixture is passed (supplied) continuously in the continuous reactor tube 30 and the good reaction product (i.e., the treated polymer product) can be thus obtained continuously.

Then, the pressure of the reaction mixture plasticized in the extruder body 50 and the continuous reactor tube 30 is reduced by the pressure reduction valve 11, further reduced step by step by the breaker plate 31. As a result, the reaction mixture is continuously supplied to the chemical agent separator 8 under the pressure lower than the internal pressure of the vicinity of the outlet of the extruder body 50 and lower than the internal pressure of the continuous reactor tube 30 and slightly higher than the atmospheric pressure. For example, the react ion mixture is supplied to the chemical agent separator 8 while being depressurized one atm (=atmospheric pressure) to tens of atm.

The reaction mixture is separated into the polymer treated product 9 which is a viscous liquid and the ethanol 22 which is gaseous in the chemical agent separator 8, where light gas (ethanol 22) is separated and shifted to the upper part of the separator, while the polymer treated product 9 is collected in the lower part of the chemical agent separator 8 ([separation step]). The polymer treated product 9 is kept at a temperature, for example, 150 to 200° C., which permits the polymer treated product 9 to be a fluid, by the chemical agent separator heater 10. Also, the inside of the chemical agent separator 8 is kept under a pressure higher than the atmospheric pressure by the tank pressure control valve 12 which is a pressure control means. The polymer treated product 9 collected in the lower part of the chemical agent separator 8 can be easily discharged from the chemical agent separator 8 through the discharge line 55a connected to the lower part of the chemical agent separator 8 by its own weight and a pressure difference between the internal pressure of the chemical agent separator 8 and the outside pressure.

The discharged polymer treated product 9 is continuously supplied to the molding extruder 2 which is a molding means ([molding step]). The polymer treated product 9 is extruded as the string-like strand 5 from the die 3 disposed at the end of the extruder 2. The extruded strand 5 is cooled to a temperature near to the ambient temperature and solidified by the cooler 4. Then, the strand 5 is cut into a predetermined length to form a pellet (molded material) 7.

On the other hand, the ethanol 22 gas separated from the polymer treated product 9 in the chemical agent separator 8 is discharged through the discharge line 55b connected to the upper part of the chemical agent separator 8 and supplied to the impurity separator 16 by a pressure difference between the internal pressure of the chemical agent separator 8 and the outside pressure (atmospheric pressure). In the impurity separator 16, the impurity 23 generated in the reaction and mixed in the ethanol 22 is separated from the ethanol 22 by utilizing a difference in boiling point therebetween. The separated pure ethanol 22 is returned to the chemical agent tank 18 through the line 56. Also, the separated impurity 23 is sucked by the blower 19 through the line 57, incinerated in the combustion apparatus 20 to make the impurity harmless. Thereafter, the harmless impurity 23 is discarded as a waste or reused.

When the vapor ethanol 22 is discharged from the chemical agent separator 8, the pressure control means including the tank pressure control valve 12 is used to control the internal pressure of the chemical agent separator 8 to a constant pressure. Especially, as shown in FIG. 3, the internal pressure of the chemical agent separator 8 is measured by the pressure gage 40 and the measured value is transferred as a pressure signal to the pressure control device 41 through a signal transfer line 42 by the pressure transfer device. The pressure control device 41 sends a valve open/close signal corresponding to the above pressure signal to the tank control valve 12 through a signal transfer line 43. The tank control valve 12 controls the opening of the valve corresponding to the valve open/close signal to control the internal pressure of the chemical agent separator 8 to be constant resultantly.

Also, as the other pressure control means, the pressure reduction valve 11 may cooperate with the tank pressure control valve 12. In this case, adding to the aforementioned pressure gage 40 and the pressure transfer device, a pressure difference measuring means to measure a pressure difference between before and after the pressure reduction valve 11 is disposed to control both the internal pressure of the chemical agent separator 8 and the pressure difference between before and after the pressure-reducing valve 11 to be constant. In the case that the pressure control is conducted by using both the pressure reduction valve 11 and the tank pressure control valve 12, if both are controlled only by the signal of the internal pressure of the chemical agent separator 8, the movements of the valves 11 and 12 may interfere with each other, allowing the pressure control or retention to be unstable. Therefore, it is desired that the pressure reduction valve 11 is controlled by using the pressure difference measured by the pressure-difference measuring means and the tank control valve 12 is controlled by using the internal pressure of the chemical agent separator 8.

As described above, in the treating method of the embodiment, the crosslinked polyethylene 21 and the ethanol 22 are thoroughly mixed and agitated in the extruder body 50 to generate the reaction mixture and the reaction mixture is retained for a sufficiently long time while being passed through, under the conditions needed to progress the reaction, the continuous reactor tube 30 disposed following the extruder body 50 and integrated therewith. This allows the reaction product (i.e., the treated polymer compound) reacted sufficiently to be continuously obtained at a yield higher than the conventional method.

If the chemical agent separator 8 is disposed directly next to the extruder body 50 without having the continuous reactor tube 30 therebetween, the reaction of the crosslinked polyethylene 21 and the ethanol 22 is conducted only inside of the barrel 51 of the extruder body 50. Therefore, it is necessary to more elongate the extruder body 50 so as to sufficiently conduct the reaction of the crosslinked polyethylene 21 and the ethanol 22 only by the extruder body 50. However, there is a limitation in elongating the extruder body 50. Namely, there is a limitation in increasing the treatment capacity per unit time in the extruder body 50 as long as the extruder body 50 with the given size is used.

In the treatment system of the embodiment, since the continuous reactor tube 30 with a variable length (volume) is disposed following the extruder body 50 and the length (volume) of the continuous reactor tube 30 can be adjusted to secure a desired reaction time, the treatment capacity per unit time in the extruder body 50 with the continuous reactor tube 30 can be increased.

The treatment system of the embodiment is particularly effective for a reaction using a crosslinked polymer as the polymer compound and alcohols or a mixture containing alcohols as the chemical agent, specifically, a reaction (e.g., a silane crosslink cutting reaction between a silane crosslinked polyethylene and an alcohol) which needs a reaction time of 30 minutes or more. The treatment system according to the present invention can be more effectively used when the chemical agent is put in a high-pressure state such as a supercritical state so as to easily react the chemical agent with the polymer, thereby securing the sufficient reaction time and suppressing a variation in pressure.

Also, if the chemical agent separator 8 is not disposed following the continuous reactor tube 30, a variation in pressure due to the expansion of gas is increased and the variation in pressure directly affects the molding extruder 2 and thereby, the amount of material (=the polymer treated product 9) to be supplied to the molding extruder 2 varies and causes a an unevenness in the molding. In addition, it is necessary to reduce the pressure to remove gases included in the reaction mixture.

In the treatment system of the invention, since the chemical agent separator 8 is disposed following the continuous reactor tube 30 and the variation in pressure due to the expansion of gas can be thereby reduced, a variation in the amount of the polymer treated product 9 supplied to the molding extruder 2 can be reduced. Especially, when the reaction mixture retained for the given time in the continuous reactor tube 30 is supplied to the chemical agent separator 8 not continuously but intermittently, the vapor ethanol 22 is expanded rapidly from the compressed state and therefore jetted forcibly with involving the polymer treated product 9 which is a viscous liquid. Even in this case, since the chemical agent separator 8 has a larger capacity than the flow rate of the reaction mixture, a variation in the internal pressure of the chemical agent separator 8 can be reduced and a variation in pressure in the devices subsequent to the chemical agent separator 8 can be also reduced. This ensures that in the molding extruder 2, molding unevenness is scarcely caused, enabling continuous and uniform molding, whereby the pellet 7 having high quality can be obtained in a highly productive yield. Moreover, since the chemical agent separator 8 is provided with pressure control means, the internal pressure of the chemical agent separator 8 can be always kept nearly constant and the variation in pressure can be suppressed more securely, whereby the pressure in the system can be stabilized.

Further, since the chemical agent separator heater 10 is disposed around the chemical agent separator 8, the temperature of the polymer treated product 9 in the chemical agent separator 8 can be kept constant within a range from 150 to 200° C. Therefore, a variation in temperature is reduced when the polymer treated product 9 is supplied to the molding extruder 2 from the chemical agent separator 8. As a result, the variation in viscosity of the polymer treated product 9 is reduced between the chemical agent separator 8 and the molding extruder 2. Therefore, the polymer treated product 9 can be supplied in a homogeneous state to the molding extruder 2.

It is needless to say that the present invention is not limited to the aforementioned embodiments and other various modifications can be assumed.

Example

Next, the present invention will be explained in more detail by way of example, to which the invention is, however, not limited.

The crosslink-cutting process of the crosslinked polyethylene 21 was carried out by using the crosslink-cutting system for the crosslinked polyethylene as shown in FIG. 1.

A two-shaft extruder having two screws was used as the extruder body 50 in the extruder 1 wherein the inside diameter (D) of the barrel 51 was 33 mm and the ratio (L/D) of the length (L) to the inside diameter of the barrel 51 was set to 50. Also, as the continuous reactor tube 30 disposed in the stage next to the extruder body 50, one having a capacity of 50 L was used.

Comparative Example

Figure 2:
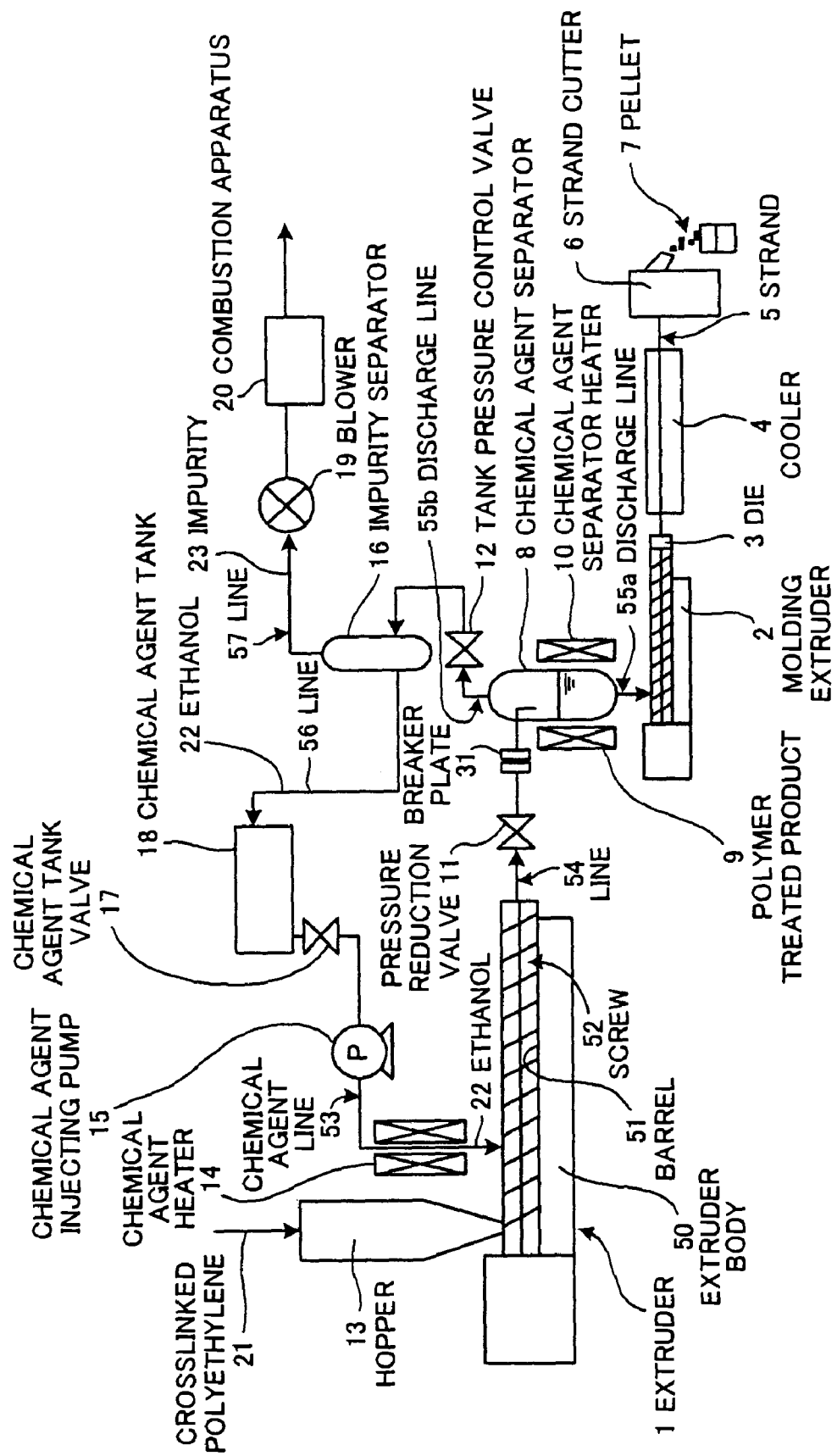
FIG. 2 is a system diagram showing a treatment system for a polymer compound as a comparative example.

The crosslink-cutting process of the crosslinked polyethylene 21 was carried out by using the crosslink-cutting system for the crosslinked polyethylene as shown in FIG. 2.

The crosslink-cutting system as shown in FIG. 2 differs from the crosslink-cutting system as shown in FIG. 1 in that the system shown in FIG. 2 is not provided with the continuous reactor tube 30 in the following stage of the extruder body 50.

When the crosslink-cutting system (example) as shown in FIG. 1 is used, the treatment capacity of the crosslinked polyethylene 21 depends on the discharge capacity (treatment capacity) of the extruder body 50 and 2 to 100 kg/h can be treated.

In contrast, when the crosslink-cutting system (comparative example) as shown in FIG. 2 is used, it is needed to secure a reaction time of 30 minutes or more while retaining the reaction mixture in the extruder body 50. As a result, the discharge capacity of the extruder body 50 is highly restricted despite its potential, and the treatment capacity of the crosslinked polyethylene 21 is less than 5 kg/h.

In short, by using the crosslink-cutting system as shown in FIG. 1, the treatment capacity of the crosslinked polyethylene 21 is increased to 20 times or more the crosslink-cutting system as shown in FIG. 2. As a result, the yield of the crosslink-cut polyethylene 21 is significantly increased. Thus, the treatment cost can be reduced, and the recycle or reuse rate of the polymer compound can be significantly increased.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A treatment system of a polymer compound wherein the polymer compound and a chemical agent are kept at a high temperature and a high pressure, comprising:
   an extruder that mixes and agitates the polymer compound and the chemical agent to react the polymer compound with the chemical agent to have a reaction mixture comprising a polymer treated product;
   a high-pressure container integrated with the extruder;
   a chemical agent separator connected following the high-pressure container to separate the reaction mixture into the polymer treated product and the chemical agent;
   a molding device connected to the chemical agent separator to mold the separated polymer treated product;
   a pressure control device disposed between the high-pressure container and the chemical agent separator;
   a heating device configured to heat the extruder and the high-pressure container to the high temperature; and
   a pressure control device configured to keep constant an internal pressure of the chemical agent separator.

2. The treatment system according to claim 1, wherein:
   the high-pressure container comprises a continuous reactor tube.

3. The treatment system according to claim 1, wherein:
   the heating device comprises an electric heater disposed around the chemical agent separator.

4. The treatment system according to claim 1, wherein:
   the heating device is disposed on an outer periphery of the chemical agent separator, and provided with a jacket in which a heating medium is circulated and a heating medium circulating device that supplies the heating medium to the jacket.

5. The treatment system according to claim 1, wherein:
   the molding device comprises a molding extruder to form the polymer treated product into an extrusion-molded material, a cooler to cool the extrusion-molded material, and a cutting device to cut the cooled extrusion-molded material.

6. The treatment system according to claim 1, wherein:
   the pressure control device comprises a discharge valve.

7. The treatment system according to claim 1, wherein:
   the pressure control device comprises a combination of a discharge valve and a resistor with plural holes.

8. The treatment system according to claim 1, wherein:
   the pressure control device comprises a resistor with plural holes, a flow control valve or a combination thereof.

* * * * *